United States Patent [19]
Lytra et al.

[11] Patent Number: 4,985,613
[45] Date of Patent: Jan. 15, 1991

[54] LOCKING ARRANGEMENT

[75] Inventors: Eric Lytra, Enfield; Peter J. Loeber, Huntingdon; Barry Simkins, Harlow, all of United Kingdom

[73] Assignee: Pitney Bowes Inc., Stamford, Conn.

[21] Appl. No.: 343,978

[22] Filed: Apr. 26, 1989

[30] Foreign Application Priority Data

Apr. 27, 1988 [GB] United Kingdom ............... 8810012

[51] Int. Cl.$^5$ ............................................. G07B 17/00
[52] U.S. Cl. ................................. 235/101; 235/130 R; 192/33 C; 192/415
[58] Field of Search ........... 235/101, 130 R, 3, 131 R, 235/132 R, 144 SP; 70/174, 182, 183, 187, 189; 192/26, 33 C, 415, 56 G, 81 C, 84 C; 188/81.6; 464/64

[56] References Cited

U.S. PATENT DOCUMENTS

| | | | |
|---|---|---|---|
| 2,669,331 | 2/1954 | Dudis et al. ................ | 192/33 C X |
| 3,529,703 | 9/1970 | Kroeker ........................... | 192/26 |
| 4,099,049 | 7/1978 | Lowe ................................ | 235/101 |
| 4,160,899 | 7/1979 | Montagnino et al. ......... | 275/101 |
| 4,340,809 | 7/1982 | Betcher .......................... | 235/101 |
| 4,777,353 | 10/1988 | Hendrickson .................. | 235/101 |

Primary Examiner—Benjamin R. Fuller
Attorney, Agent, or Firm—Robert E. Meyer; David E. Pitchenik; Melvin J. Scolnick

[57] ABSTRACT

A locking arrangement is disclosed for a machine, such as a postage meter, which includes a rotatable member (12) which rotates when the machine performs an operating cycle and a mechanical or electromechanical register (22; 20) for being incremented or decremented in response to operation of the machine. The arrangement includes a clutch (24) arranged between a fixed structure or member (28) and the rotatable member (12) the clutch being operable to engage or release said fixed structure or member. Means (60; 78) are associated with the registers (22; 20) for actuating the clutch to prevent rotation of the rotatable member (12) when the register displays a predetermined value.

14 Claims, 5 Drawing Sheets

4,985,613

LOCKING ARRANGEMENT

FIELD OF THE INVENTION

This invention relates to a locking arrangement for a machine which operates on a cylical basis and includes a mechanical or electromechanical register for example a postage meter. The arrangement may be used in other machines, for example other machines which print value or photocopiers.

BACKGROUND OF THE INVENTION

Certain postage meters include a mechanical counting mechanism for accounting for postage franked. Such counting mechanisms may comprise an ascending register which keeps a tally of the total postage franked by the meter and a descending register which keeps a tally of the amount of credit remaining. When the credit runs low, the postage meter user takes the meter to the postal authorities and buys more credit which is entered into the meter by adjusting the descending register.

Security considerations require that the meter be rendered inoperative when the descending register reaches a pre-set low value (a credit lock-off), thus compelling the user to have the meter recharged. Also, the machine is required to be rendered inoperative after a given accumulated amount of value has been franked (a total lock-off). It is desirable that the credit lock-off may be released merely by recharging the meter with credit, but that total lock-off be releasable only by major disassembly of a meter. This is so that the machine can be examined at a service centre for signs of wear and/or tampering. It is also desirable that the lock-offs be achieved by mechanical means.

SUMMARY OF THE INVENTION

According to one aspect of this invention, there is provided a postage meter including a rotatable drum having means for printing postage value, a mechanical or electromechanical register for storing accounting data, clutch means arranged between a fixed structural member and said drum and being operable to engage or release said fixed structural member, and means associated with said counter for actuating said clutch to prevent rotation of the drum relative to the fixed structural member when said register displays a pre-determined value.

The invention also provides, in another aspect, a locking arrangement for a machine which includes a rotatable member which rotates when the machine performs an operating cycle and a mechanical or electromechanical register for being incremented or decremented in response to operation of said machine and having a plurality of counter wheels interconnected by respective geneva gears, said locking arrangement comprising an actuator leg, mounting means for mounting the actuator leg in driving connection with any one of a selected group of geneva gears, and a clutch or brake mechanism associated with said movable member and including an operator arm for being engaged by said actuator leg.

BRIEF DESCRIPTION OF THE DRAWINGS

A non-limiting example of a postage meter of this invention incorporating a lock-off arrangement will now be described in detail, reference being made to the accompanying drawings, in which.

SPECIFIC DESCRIPTION OF A PREFERRED EMBODIMENT

The drawings illustrate parts of a postage meter of the type which stores accounting data on mechanical ascending and descending registers. The ascending register keeps a tally of total postage value franked and is incremented with the value set on the print wheels of the postage meter drum each time the meter performs a printing cycle. The descending register keeps a tally of the credit remaining on the machine and is decremented by the set value on the printing wheels in each printing cycle. When the credit value as displayed by the descending register approaches zero or a pre-set value, the postage meter user recharges the machine by taking the machine to a recharging centre, e.g. a Post Office, where a fresh amount of credit is entered into the machine by manual adjustment of the descending register.

Figure 1:
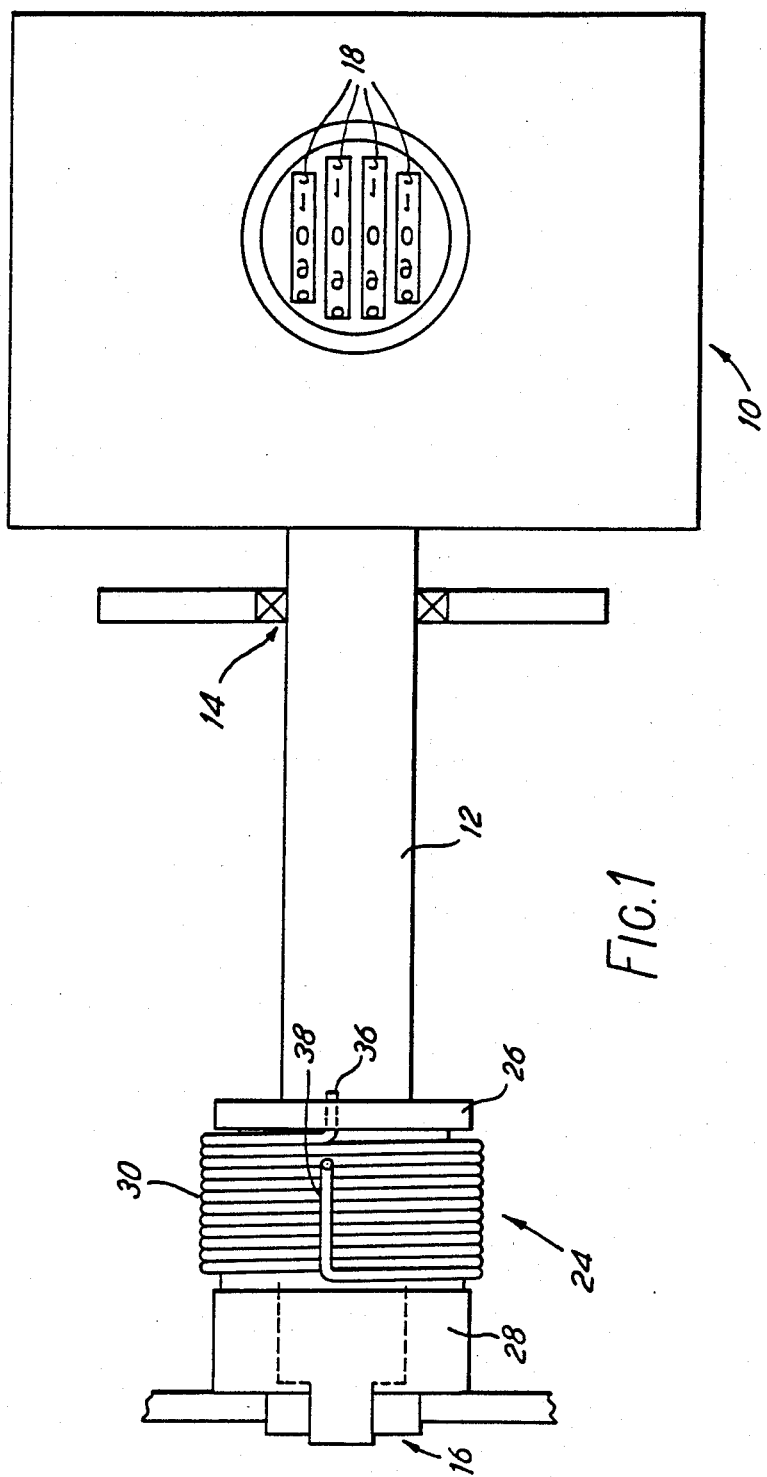
FIG. 1 is a schematic view of a print drum and shaft of a postage meter incorporating a lock-off arrangement of this invention.

Referring initially to FIG. 1, the postage meter includes a print drum 10 including a drum shaft 12 which is rotatably mounted on the chassis (not shown) of the meter by means of a roller bearing 14 and an anti-reverse bearing 16. The print drum 10 includes a bank of four settable print wheels 18 which are set by means of movable racks (not shown) mounted within the shaft 12. There may be a different number of print wheels depending on the country in which the meter is intended to be used. For example U.K. machines require only 3 print wheels. As is known in certain existing postage meters, a rising pawl mechanism (not shown) is associated with the drum shaft 12 which causes the ascending and descending registers 20 and 22 (not shown in FIG. 1) to be incremented and decremented by the amount set on the print wheels 18 when the print drum 10 is rotated through 360° to perform a printing cycle. Adjacent the anti-reverse bearing 16, the drum shaft includes a clutch arrangement 24 to provide for lock-off of the meter under predetermined conditions.

Figure 2:
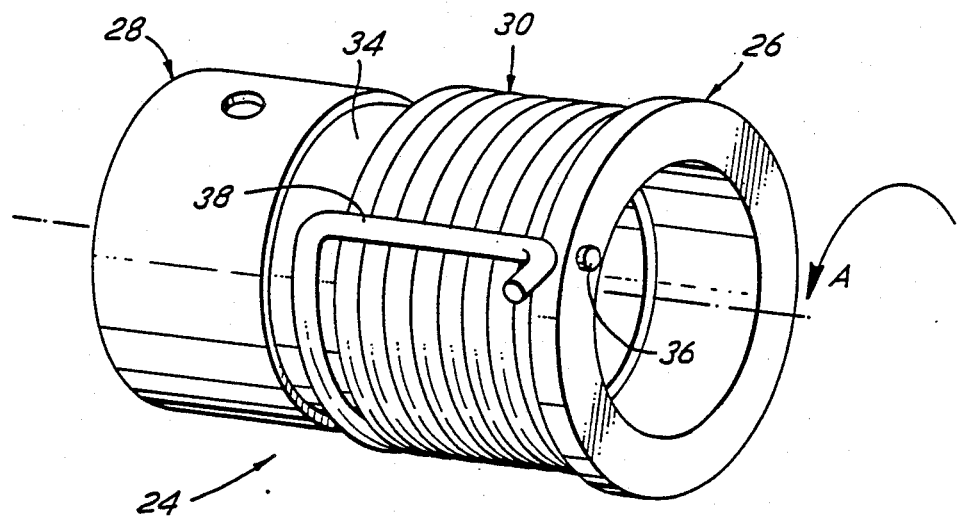
FIG. 2 is a detail perspective view showing the clutch incorporated in the lock-off arrangement.
Figure 3:
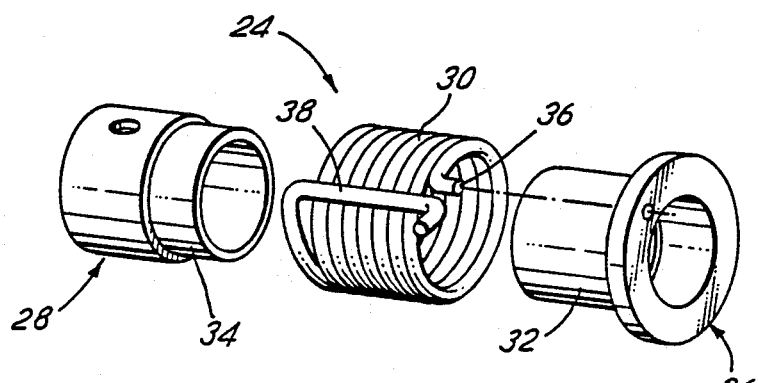
FIG. 3 is an exploded view of the clutch illustrated in FIG. 2.
Figure 5:
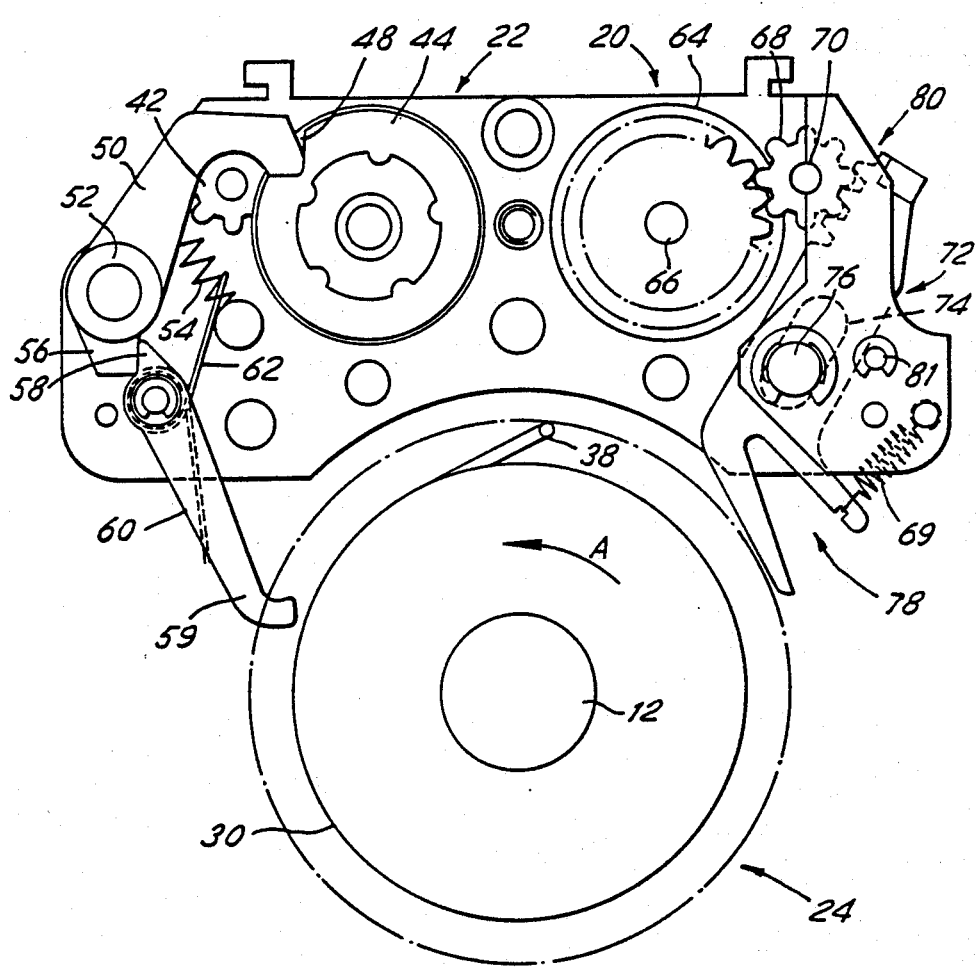
FIG. 5 is a schematic end view on the ascending and descending registers showing various parts of the lock-off arrangement.

Referring additionally to FIGS. 2 and 3, the clutch arrangement 24 comprises a moving hub 26 which is secured to the drum shaft 12 and rotates therewith, a fixed hub 28 which is fixed to the chassis around the end of the shaft adjacent the anti-reverse bearing 16, and a wrap spring 30 which surrounds respective opposed sleeve portions 32 and 34 of the moving and fixed hubs 26 and 28. The wrap spring is of cylindrical form having one end 36 bent to form a peg which locates in a bore in the moving hub 26 and the opposite end being bent through 90° to form an elongate portion 38 which extends parallel to the axis of the coil and is spaced radially outwardly of the periphery of the coil as may be more clearly seen in FIG. 5. The internal dimensions of the wrap spring 30 are such that, in the unstressed condition, the spring 30 surrounds the sleeve portion 34 of the fixed hub with clearance, but that resistance to movement of the elongate portion 38 causes the spring to contract onto and firmly to clamp the sleeve 34 of the fixed hub 28 thus preventing further movement of the movable hub 26, and thus the drum shaft 12.

The clutch arrangement 24 is arranged with respect to the normal direction of movement "A" allowed by anti-reverse bearing 16 so that movement of the elongate portion 38 relative to the wrap spring 30 in the sense opposite to that of the normal direction of rotation "A" of the drum shaft 12 causes the spring to contract onto the fixed hub 28. In this way, once the wrap spring 30 has engaged the fixed hub 28, release can only be effected by movement of the elongate portion 38 relative to the remainder of the spring in the same sense as the normal direction of rotation "A" allowed by the anti-reverse bearing 16. The drum shaft 12 is prevented from rotating in its normal direction because such rotation would cause the wrap spring to grip the fixed hub 28 more tightly and prevented from rotation in the opposite direction by anti-reverse bearing 16.

It will be understood from the description so far that when the drum shaft 12 is rotating in direction "A", it can be brought rapidly to a standstill by merely bringing a blocking member such as an actuating arm or leg into the path of movement of the elongate portion 38 so that the elongate portion is moved relative to the remainder of the wrap spring 30 to cause it to contract onto the fixed hub 38. Once in this condition (the lock-off condition), release of the clutch arrangement is effected by releasing the elongate portion 38 so that it can return to an unstressed position, thus releasing engagement with the fixed hub 38.

Figure 4:
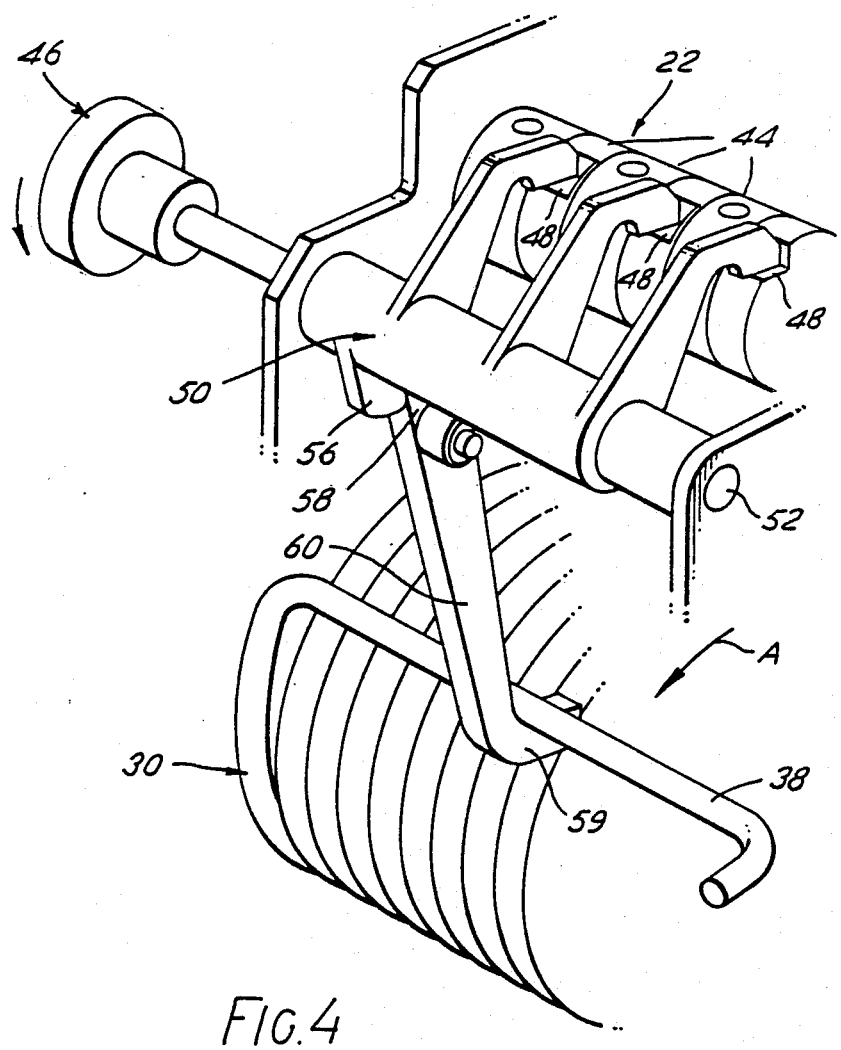
FIG. 4 is a perspective view of part of the descending register of a postage meter, showing its co-operation with the lock-off arrangement.

Referring now to FIG. 4, there is shown, in perspective, part of the descending register 22. The location of the descending and ascending registers 22 and 20 with respect to the clutch arrangement 24 and the drum shaft 12 may be seen in FIG. 5. The descending register 22 may typically comprise even counter wheels 44 interconnected in known fashion by geneva gears 42. In FIG. 4 the three most significant counter wheels 44 of the register are shown. Postage values are decremented from the four least significant counter wheels 44 (not shown) by means of associated gear mechanisms (not shown). The register may be recharged, or credited with funds, by means of a credit-add knob 46 which engages, via a releasable clutch and gear drive (not shown) the third most significant counter wheel 44 illustrated in FIG. 4. Each of the three most significant counter wheels 44 includes a recess 48 engageable by the respective free ends of a three-pronged lock comb 50 which is pivotally mounted by shaft 52 on the register structure and spring biased by tension springs 54 (see FIG. 5) against the periphery of the counter wheels 44. The lock comb 50 is arranged to move under the influence of the springs 54 so that the ends of the lock comb engage each of the recesses 48 when the three most significant counter wheels 44 display 0—0.

The lock comb 50 includes a projecting lug 56 which engages the corresponding lub 58 of an L-shaped actuating arm 60 which is pivotally mounted on the register structure. The actuating arm 60 is biased by means of a spring 62 (see FIG. 5) towards a piston in which an end part 59 of the actuating arm 60 lies in the path of movement of the elongate portion 38 of the wrap spring 30. The lugs 56 and 58 of the lock comb 50 are arranged so that when the most significant counter wheels 44 display a value other than 0—0—0, the actuating arm 60 is located out of the path of movement of the elongate portion 38 but that when the counter wheels 44 reach 0—0—0, the lock comb 50 moves to engage each of the recesses 48 thus moving lug 56 to allow the actuating arm 60 to move into the path of travel of the elongate portion 38 thus actuating the clutching arrangement to 24 cause the drum shaft 12 to be locked against further movement in either sense.

In one arrangement the lock-off arrangement first described is employed as a mechanical fail safe for a switch actuated lock-off engagement. In this system a microswitch (not shown) is arranged adjacent the lock comb 50 and is actuated when the lock comb moves as the counter wheels 44 reach 0—0—0. Actuation of the microswitch cut the power supply to the driving motor of the postage meter thereby rendering it inoperative. In this system, the mechanical and electrical lock-off arrangements are arranged so that the electrical lock-off arrangement is actuated one or more print cycles before the mechanical lock-off arrangement is actuated.

When the mechanical lock-off has been actuated, recharging of the descending register with funds causes the counter wheels 44 to move away from the 0—0—0 value so that the lock comb 50 rotates so that lug 56 causes lug 58 to move the actuating arm 60 back out of the path of movement of the elongate portion 38, thus releasing the elongate portion 38 and the clutch arrangement 24.

Figure 6:
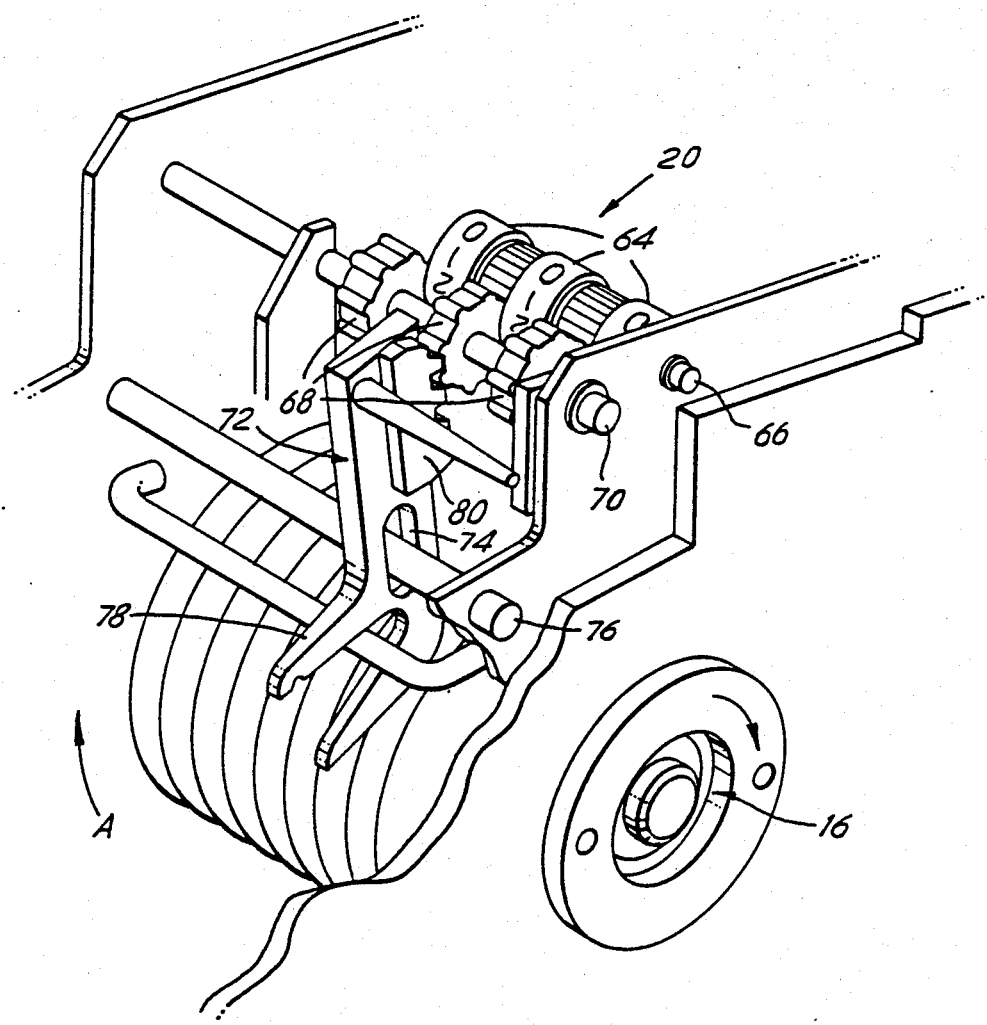
FIG. 6 is a perspective view of part of the ascending register of a postage meter, showing its co-operation with the lock-off arrangement.

Referring now to FIG. 6, there is shown, in perspective, part of the ascending register 20. The ascending register may typically comprise ten counter wheels 64 mounted on a common shaft 66 and interconnected in known manner by geneva gears 68 mounted on a common shaft 70 to provide a register function.

Adjacent a selected geneva gear 68 is slidably mounted an actuator leg 72 for generally linear sliding movement between limits set by a slot 74 and shaft 76 and carrying at its lower end a claw portion 78 opening in the sense opposed to the normal direction of rotation of the drum shaft. The upper end of the actuating leg 72 carries a rack 80 which engages the selected geneva gear 68. A tension spring 69 extends between the claw portion 78 and the register structure to bias the claw portion to a position outside the path of movement of the elongate portion 38 of the wrap spring 30. The actuator leg 72 is constrained to move linearly by cooperation of the slot 74 and 76, engagement of the rack 80 and the associated geneva gear, and by horizontal shaft 81 (see FIG. 5). When the lesser significant counter wheel 64 engaging the selected geneva gear 68 increments from 9 to 0, the geneva gear 68 will rotate to move the adjacent counter wheel from 0 to 1 and, at the same time, will move the actuating leg 72 downwards via the rack 80 so that the claw portion 78 thereof lies in the path of movement of the elongate portion 38 of the wrap spring. Thus, within one revolution of the print drum 10 following downward movement of the actuating leg 72, the clutch arrangement 24 will be actuated to lock the drum shaft 12 against further movement in either sense. When mechanical lock-off has occurred on actuation of the actuator leg 72, the elongate portion 38 will be held in the claw portion 78.

In contrast with the actuator arm 60, the actuation of actuator leg 72 is not readily reversible because of the anti-reverse bearing 16 as the elongate portion 38 is caught in the claw portion 78. Movement of the elongate portion 38 in the direction of the claw opening will only result in further tightening of the clutch arrangement 24. The only way in which the clutch arrangement 24 may be released is by major disassembly of the postage meter to remove the drum shaft 12 to take the clutch arrangement apart.

As with the lock-off associated with the descending register 40 (the credit lock-off) the lock-off associated with the ascending register 42 (the total lock-off) may be a mechanical fail safe arrangement for an electrically operated lock-off driven by a microswitch associated with the ascending register 42. In this case it is preferred that the electrically operated lock-off be activated at least one cycle in advance of activation of the mechanical lock-off.

The ascending register 42 has been designed so that the actuator leg 72 may be adjusted to be driven off any of the geneva gears 68. This is because the primary support elements for the actuator leg 72 are parallel horizontal shafts which allow the actuator leg 72 to be positioned at any transverse position so that actuator leg 72 can easily be positioned adjacent a selected geneva gear. Also, the other end of the tension spring 68 which biases the actuator leg is mounted on a horizontal shaft. This is of significant advantage in production for it means that the manufacturer can adjust the value of the high lock-off to suit the local currency of the country for which the postage meter is intended. For example the high lock-off may be adjusted to be activated at any value 10 units where is an integer.

The lock-off arrangement described and illustrated is thus capable of being independently activated for a pre-set value reached by the descending register and for a pre-set value associated with the ascending register. A postage meter may incorporate only one of the high and low lock-off mechanical arrangements but it is preferred for the metermeter to include both. The illustrated arangement enables a mechanical lock-off to occur in response to two independent pre-set conditions and does not require the use of electrical actuators. Moreover, the arrangement may be incorporated in existing postage meters with only minor modification.

What is claimed is:

1. A locking arrangement for a machine, said machine including a fixed structural member and a rotatable member which rotates when the machine performs an operating cycle and a mechanical or electromechanical register for being incremented or decremented in response to operation of said machine, said locking arrangement comprising clutch means arranged between said fixed structural member and said rotatable member for operatively engaging or releasing said fixed structural member, means associated with said register for actuating said clutch to prevent rotation of the rotatable member relative to the fixed structural member when said register displays a pre-determined value and wherein said clutch means includes a coil spring having two respective end regions, one end region being secured to said rotatable member and the other end region thereof in an unstressed state surrounding with clearance the fixed structural member wherein actuation of said actuator causes said other end region of said coil spring to be stressed to contract onto and engage and fixed structural member.

2. A locking arrangement according to claim 1, wherein said rotatable member includes a shaft, said fixed structural member is a fixed hub and said clutch means is arranged between an end region of said shaft and said fixed hub.

3. A locking arrangement according to claim 1, wherein said other end region includes an elongate portion which extends parallel to, but spaced from an axis through said coil spring.

4. A locking arrangement according to claim 3, which includes a blocking member associated with said register, and wherein said blocking member is moved into a predetermined path of movement of said elongate portion when said register reaches said pre-determined value.

5. A locking arrangement according to claim 4, wherein said register includes a plurality of counter wheels for rotation about a common axis and at least one of said counter wheels including a recess at a predetermined position on a periphery thereof, a respective sensor arm for being urged into engagement with said recess in the periphery of said at least one of said counter wheels and an actuator arm for being brought into the path of movement of the elongate portion when said respective sensor arm engages the recess.

6. A locking arrangement according to claim 5, wherein said actuator arm is pivotally mounted and biased towards a position wherein said actuator arm lies in the path of movement of said elongate portion, and wherein movement of said at least one of said counter wheels to a position in which the respective sensor arm is no longer in engagement with the recess, said actuator arm is caused to be drawn out of the path of movement of said elongate portion.

7. A locking arrangement according to claim 4, wherein said register is a descending register and further comprising means for manually adjusting an amount displayed on said register.

8. A locking arrangement according to claim 5, wherein said register includes a plurality of counter wheels for rotation about a common axis and a geneva gear is provided between at least two of said counter wheels and an actuator leg is in driving engagement with said geneva gear whereby rotation of said geneva gear causes said actuator leg to be moved into the path of movement of the elongate portion of said coil spring.

9. A locking arrangement according to claim 8, wherein a plurality of geneva gears are provided each between a respective adjacent pair of counter wheels and mounting means are provided whereby said actuator leg may be located in driving engagement with any one of a selected group of geneva gears.

10. A locking arrangement according to claim 8 wherein said actuator leg includes a claw portion for engaging said elongate portion said claw portion being arranged such that, when said elongate portion is engaged thereon, movement of said elongate portion in a sense to remove said elongate portion from said claw is in a sense to further contract said coil spring.

11. A locking arrangement according to claim 8, further including an ascending register and a descending register and said actuator arm is drivably associated with said descending register and said actuator leg is drivably associated with said ascending register.

12. A locking arrangement according to claim 1, wherein said rotatable member is mounted on said fixed structural member by bearing means allowing rotation of the rotatable member in only one sense and the coil spring is arranged so that movement of the other end region relative to the movable member in another sense opposed to said one sense causes contraction of said spring.

13. A locking arrangement as claimed in claim 12 wherein said rotatable member is a rotatable drum means for printing postage value and said register stores accounting data.

14. A locking arrangement for a machine which includes a fixed structural member and a rotatable member which rotates when the machine performs an operating cycle and a mechanical or electromechanical register for being incremented or decremented in response to operation of said machine and having a plurality of counter wheels interconnected by respective geneva gears, said locking arrangement comprising an actuator leg, mounting means for mounting the actuator leg in driving connection with any one of a selected group of geneva gears, and a clutch associated with said rotatable member, said clutch comprising a coil spring having two respective end regions, one end region being secured to said rotatable member and the other end region thereof in an unstressed state surrounding with clearance said fixed structural member, said actuator leg being movable into a position for engaging said coil spring to stress said coil spring to contract onto said fixed structural member, whereby rotation of said rotatable member is prevented.

* * * * *